United States Patent
McKay et al.

(10) Patent No.: US 6,892,207 B2
(45) Date of Patent: May 10, 2005

(54) METHOD OF UPDATING DATA IN A COMPRESSED DATA STRUCTURE

(75) Inventors: Christopher W. T. McKay, Auckland (NZ); Steven Skillcorn, Queenstown (NZ)

(73) Assignee: Hewlett-Packard Development Company, L.P., Houston, TX (US)

( * ) Notice: Subject to any disclaimer, the term of this patent is extended or adjusted under 35 U.S.C. 154(b) by 223 days.

(21) Appl. No.: 10/350,358

(22) Filed: Jan. 24, 2003

(65) Prior Publication Data

US 2004/0148303 A1 Jul. 29, 2004

(51) Int. Cl.[7] ............................................. G06F 17/30
(52) U.S. Cl. ...................................... 707/101; 707/203
(58) Field of Search ................................ 707/101, 203

(56) References Cited

U.S. PATENT DOCUMENTS 5,452,405 A * 9/1995 Vondran, Jr. ............... 358/1.15
5,813,017 A * 9/1998 Morris ........................ 707/204
6,542,906 B2 * 4/2003 Korn ........................... 707/203
2004/0148302 A1 * 7/2004 McKay et al. .............. 707/101

* cited by examiner

*Primary Examiner*—Charles Rones

(57) ABSTRACT

A method of and computer-readable instructions for updating data stored in a compressed data structure. The data is stored in compressed form in one or more uniquely identified data pages. The method includes decompressing a data page and reading an entry, having an identifier, from a delta file and reading an entry from the decompressed data page. If the delta file entry identifier identifies the data page entry, the data page entry is updated based on the delta file entry. If the delta file entry identifier does not identify a data page entry, a data page entry based on the delta file entry is created. If all data file entries and data page entries have been read and handled, the data page entries are compressed.

20 Claims, 5 Drawing Sheets

METHOD OF UPDATING DATA IN A COMPRESSED DATA STRUCTURE

RELATED APPLICATIONS

This application is related to co-pending applications entitled, "Single System for Managing Multi-platform Data Retrieval" Ser. No. 10/350,327; "Compressed Data Structure for a Database" Ser. No. 10/350,326; "Compressed Data Structure for Extracted Changes to a Database and Method of Generating the Data Structure" Ser. No. 10/350,356; and "Portable Executable Software Architecture" Ser. No. 10/350,090; all assigned to the present assignee, all of which are hereby incorporated by reference in their entirety, and all of which are being filed concurrently herewith. This application is also related to co-pending applications entitled, "E-service to Manage and Export Contact Information" Ser. No. 09/507,043 filed Feb. 18, 2000; "E-Service to Manage Contact Information and Signature Ecards" Ser. No. 09/507,631 filed Feb. 18, 2000; "E-service to Manage Contact Information and Track Contact Location" Ser. No. 09/507,043 filed Feb. 18, 2000; and "E-service to Manage Contact Information with Privacy Levels" Ser. No. 09/507,215 filed Feb. 18, 2000, all assigned to the present assignee, and all of which are hereby incorporated by reference in their entirety.

FIELD OF THE INVENTION

The present invention relates to a method of and apparatus for updating data in a data structure for a database, and more particularly, to such a method and apparatus wherein the data structure is compressed.

BACKGROUND

It is known in the art to compress a database including data to minimize storage requirements for storing the data and reduce transmission times for transmitting the data. In prior approaches, the entire database is compressed and decompressed or extracted for manipulation/query of the data in the database. For example, prior approaches are directed to reducing the search time required for searching over a large database using methods such as binary searches or b-trees both of which require that the data in the database can be read randomly. In order to support random reading from and writing to a compressed database, the entire database must be decompressed.

There is a need in the art for a method of enabling update of data in a database having a compressed data structure without requiring decompression of the entire database. That is, the database remains compressed and occupies a smaller storage space thereby requiring less memory and less transmission time to transfer the database update contents.

For example, handheld or embedded devices are constrained by limited processing power and limited storage or memory in order to increase the device's battery life. A method of updating a compressed database would enable a larger amount of data to be stored on the device and would decrease update time. However, prior approaches have always decompressed the entirety of the data prior to update of the data on the device thereby eliminating any advantage gained from database compression.

SUMMARY

It is therefore an object of the present invention to provide a method of updating data in a compressed data structure for a database.

Another object of the present invention is to provide a mechanism for updating the data in the database without requiring decompression of the entire database.

The present invention provides a method and computer-readable medium including instructions for updating data in a compressed data structure. Update of the data is primarily in compressed form yielding a reduced storage requirement for storing the data and minimizing the storage required to perform the update. The data structure is structured to enable a reduced data search and access time for finding and accessing data in the compressed data structure.

A method aspect of updating data in a compressed data structure includes the data stored in one or more uniquely identified, compressed data pages. A data page is decompressed. An entry is read from a delta file storing updates to be applied to the data. Each delta file entry includes an identifier identifying an update. An entry from the decompressed data page is read and a determination is made if the delta file entry identifier identifies the data page entry. If the identifier identifies the data page entry, the data page entry is updated based on the delta file entry. If the identifier does not identify a data page entry, a data page entry based on the delta file entry is created. If all delta file entries and data page entries have been read, the data page entries are compressed.

A computer-readable medium aspect includes (1) a data structure for a compressed database including one or more uniquely identified, compressed data pages for storing one or more uniquely identified data page entries, (2) instructions for execution by a processor to cause the processor to update data in a compressed data structure, and (3) a delta file for storing a change entry having a unique identifier. The instructions, when executed by the processor, cause the processor to read a change entry from the delta file and decompress a data page from the compressed database. The decompressed data page entries are searched for a data page entry matching the change entry identifier. If a match is found, the matching data page entry is updated based on the delta file entry. If a match is not found, a data page entry based on the delta file entry is created. The data page entries are compressed.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention.

DESCRIPTION OF THE DRAWINGS

The present invention is illustrated by way of example, and not by limitation, in the figures of the accompanying drawings, wherein elements having the same reference numeral designations represent like elements throughout and wherein.

DETAILED DESCRIPTION

In coordination with the above-referenced applications, an embodiment of the present invention provides the file structures and functionality to update a compressed data structure in a database for use with a unified service to manage multi-platform data retrieval, such as the unified service referenced above.

Figure 1:
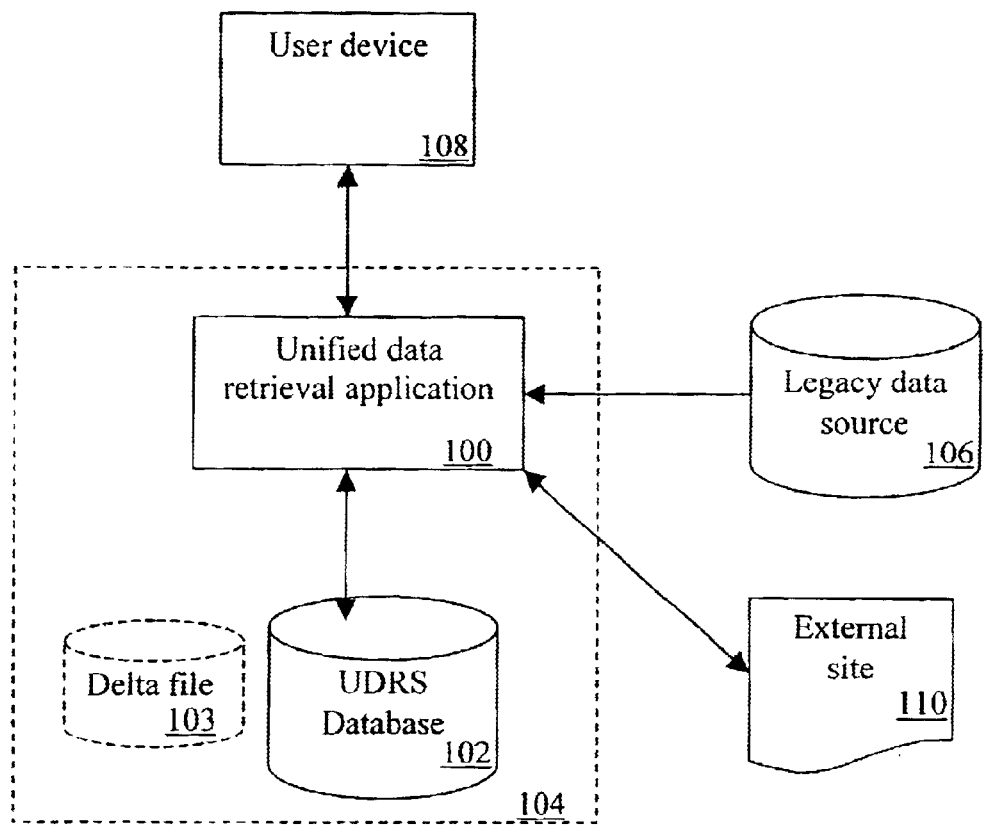
FIG. 1 is a high level block diagram of a logical architecture with which an embodiment of the present invention may be used.

FIG. 1 is a high level diagram of the unified service logical architecture in conjunction with which an embodiment of the present invention may be used. As described in detail in "Unified Service to Manage Multi-Platform Data Retrieval," assigned to the present assignee and hereby incorporated by reference in its entirety, a unified data retrieval application 100, a unified data retrieval service (UDRS) database 102, and a delta file 103 in combination make up a unified data retrieval service 104. Delta file 103 is an optional component of UDRS 104. Delta file 103 is generated by a processor (not shown) executing UDRS 104 instructions causing the processor to compare the data in older versions of UDRS database 102. The delta file 103 generation process is described in more detail in co-pending application entitled, "Compressed Data Structure for Extracted Changes to a Database." If the data in UDRS database 102 has not changed, then there will be no delta file 103. In an alternate embodiment, delta file 103 may be stored in a delta server (not shown) and accessed by UDRS 104.

UDRS 104 accesses a legacy data source 106, e.g. lightweight directory authentication protocol (LDAP) directory servers, human resources databases, and other existing data sources internally located on a network, e.g. a company internal network, to obtain additional information for storage in UDRS database 102 and/or presentation to a user using a user device 108. The additional information may be obtained on a scheduled basis or responsive to a user query received from a user manipulating user device 108, e.g. a web browser executing on a handheld device, connected to UDRS 104. Additionally, requests may be received and responded to by UDRS 104 accessing an external site 110, for example accessing information stored at a web site, e.g. www.ecardfile.com. In this manner, the UDRS 104 obtains information from multiple data sources and provides information in response to user requests.

Figure 2:
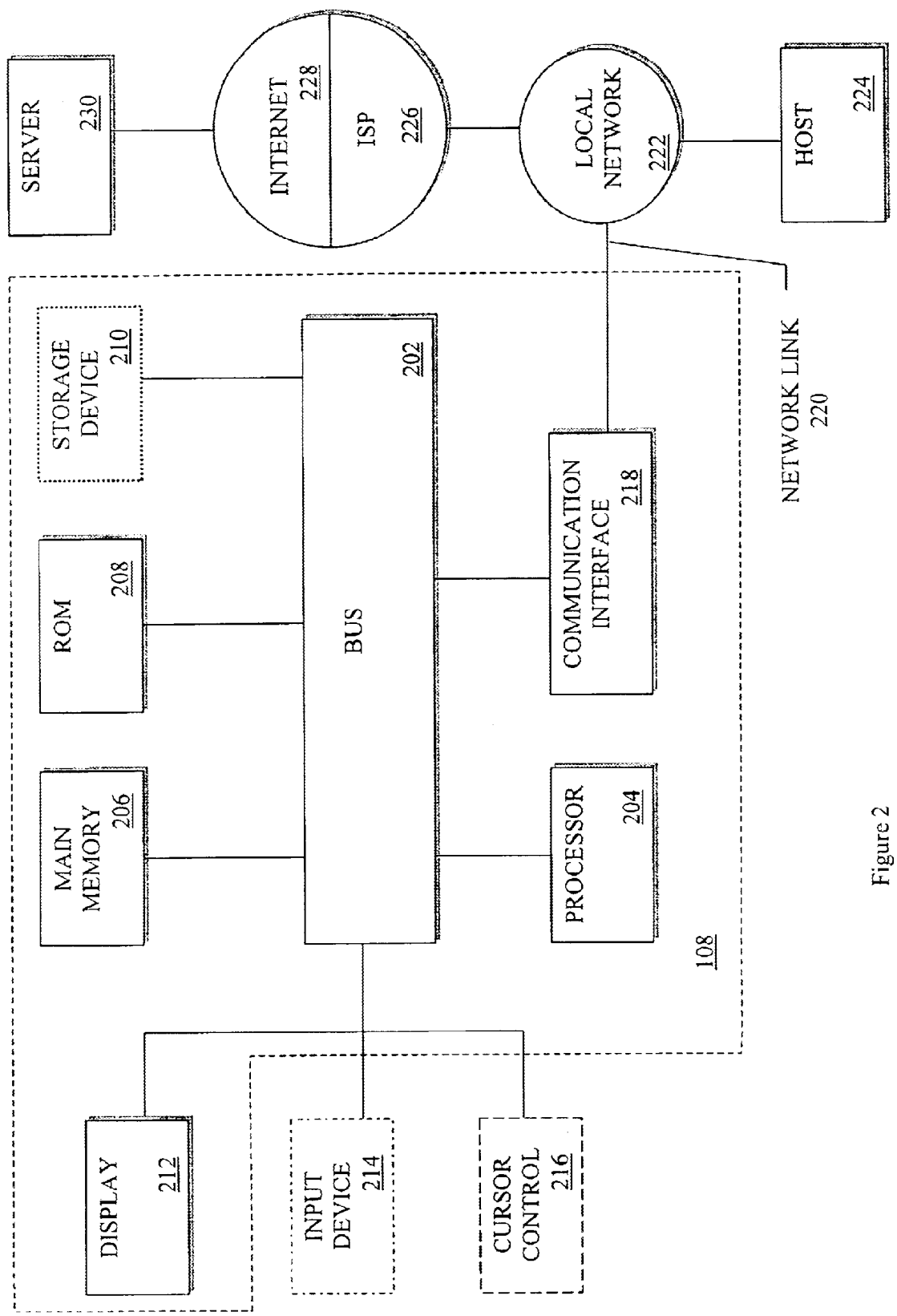
FIG. 2 is a high level block diagram of an exemplary computer upon which an embodiment of the present invention may be used.

FIG. 2 is a block diagram depicting an exemplary computer or user device 108, e.g. a handheld device, upon which an embodiment of the present invention may be implemented. The present invention is usable with currently available handheld and embedded devices, and is also applicable to personal computers, mini-mainframes, servers and the like.

Computer 108 includes a bus 202 or other communication mechanism for communicating information, and a processor 204 coupled with the bus 202 for processing information. Computer 108 also includes a main memory 206, such as a random access memory (RAM) or other dynamic storage device, coupled to the bus 202 for storing a data structure for a compressed database according to an embodiment of the present invention and instructions to be executed by processor 204. Main memory 206 also may be used for storing temporary variables or other intermediate information during execution of instructions to be executed by processor 204. Computer 108 further includes a read only memory (ROM) 208 or other static storage device coupled to the bus 202 for storing static information and instructions for the processor 204. A storage device 210 (dotted line), such as a compact flash, smart media, or other storage device, is optionally provided and coupled to the bus 202 for storing instructions.

Computer 108 may be coupled via the bus 202 to a display 212, such as a flat panel touch-sensitive display, for displaying an interface to a user. In order to reduce space requirements for handheld devices, the display 212 typically includes the ability to receive input from an input device, such as a stylus, in the form of user manipulation of the input device on a sensing surface of the display 212. An optional input device 214 (dash dot line), such as a keyboard including alphanumeric and function keys, is optionally coupled to the bus 202 for communicating information and command selections to the processor 204. Another type of optional user input device is cursor control 216 (long dash line), such as a stylus, pen, mouse, a trackball, or cursor direction keys for communicating direction information and command selections to processor 204 and for controlling cursor movement on the display 212. This input device typically has two degrees of freedom in two axes, a first axis (e.g., x) and a second axis (e.g., y) allowing the device to specify positions in a plane.

The invention is related to the use of computer 108, such as the depicted computer of FIG. 2, to update data in a compressed data structure for a database. According to one embodiment of the invention, data is updated from a database by computer 108 in response to processor 204 executing sequences of instructions contained in main memory 206 in response to input received via input device 214, cursor control 216, or communication interface 218. Such instructions may be read into main memory 206 from another computer-readable medium, such as storage device 210. A user interacts with the database via an application providing a user interface displayed (as described below) on display 212.

However, the computer-readable medium is not limited to devices such as storage device 210. For example, the computer-readable medium may include a floppy disk, a flexible disk, hard disk, magnetic tape, or any other magnetic medium, a compact disc-read only memory (CD-ROM), any other optical medium, punch cards, paper tape, any other physical medium with patterns of holes, a random access memory (RAM), a programmable read only memory (PROM), an erasable PROM (EPROM), a Flash-EPROM, any other memory chip or cartridge, a carrier wave embodied in an electrical, electromagnetic, infrared, or optical signal, or any other medium from which a computer can read. Execution of the sequences of instructions contained in the main memory 206 causes the processor 204 to perform the process steps described below. In alternative embodiments, hard-wired circuitry may be used in place of or in combination with computer software instructions to implement the invention. Thus, embodiments of the invention are not limited to any specific combination of hardware circuitry and software.

Computer 108 also includes a communication interface 218 coupled to the bus 202 and providing two-way data communication as is known in the art. For example, communication interface 218 may be an integrated services digital network (ISDN) card, a digital subscriber line (DSL) card, or a modem to provide a data communication connection to a corresponding type of telephone line. As another example, communication interface 218 may be a local area network (LAN) card to provide a data communication connection to a compatible LAN. Wireless links may also be implemented. In any such implementation, communication interface 218 sends and receives electrical, electromagnetic or optical signals which carry digital data streams representing various types of information. Of particular note, the communications through interface 218 may permit transmission or receipt of instructions and data to be stored and accessed from the database. For example, two or more computers 108 may be networked together in a conventional manner with each using the communication interface 218.

Network link 220 typically provides data communication through one or more networks to other data devices. For example, network link 220 may provide a connection through local network 222 to a host computer 224 or to data equipment operated by an Internet Service Provider (ISP) 226. ISP 226 in turn provides data communication services through the world wide packet data communication network now commonly referred to as the "Internet" 228. Local network 222 and Internet 228 both use electrical, electromagnetic or optical signals which carry digital data streams. The signals through the various networks and the signals on network link 220 and through communication interface 218, which carry the digital data to and from computer 108, are exemplary forms of carrier waves transporting the information.

Computer 108 can send messages and receive data, including program code, through the network(s), network link 220 and communication interface 218. In the Internet example, a server 230 might transmit a requested code for an application program through Internet 228, ISP 226, local network 222 and communication interface 218. In accordance with an embodiment of the present invention, computer 108 interacts with UDRS 104, e.g. on a server 230, to retrieve update information stored on UDRS 104 via Internet 228, ISP 226, local network 222, and communication interface 218.

The received code may be executed by processor 204 as it is received, and/or stored in storage device 210, or other non-volatile storage for later execution. In this manner, computer 108 may obtain application code in the form of a carrier wave.

Figure 3:
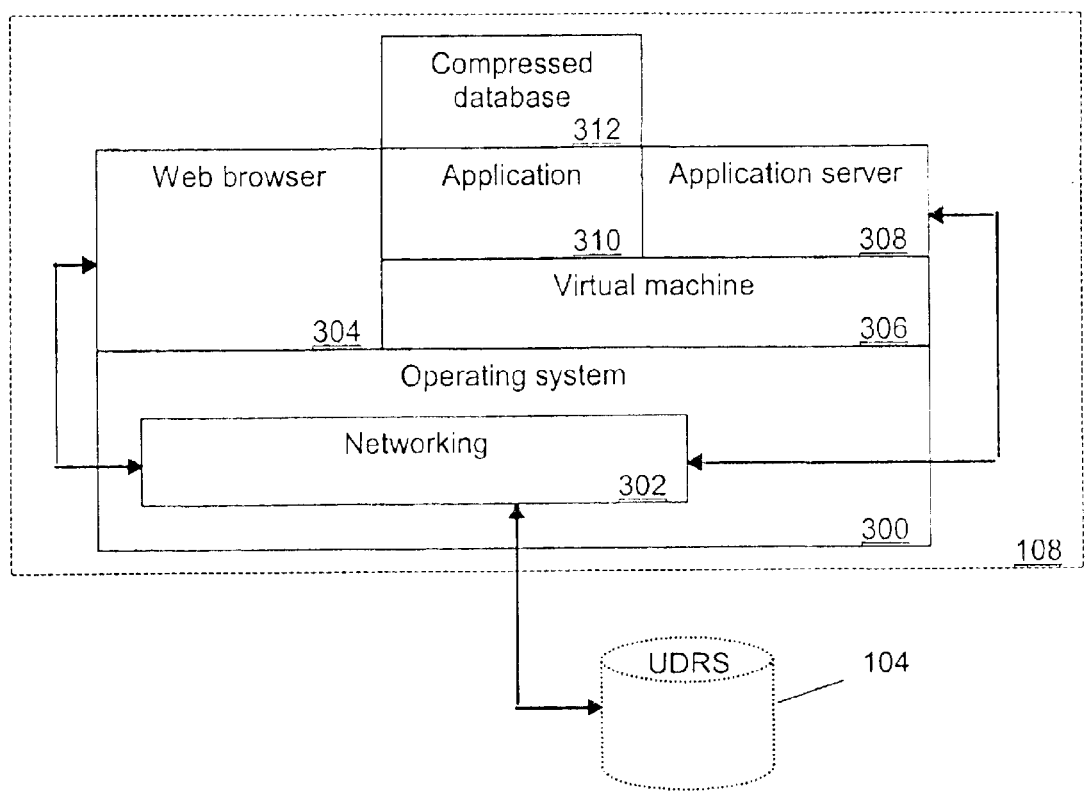
FIG. 3 is a high level block diagram of a portable software architecture usable with an embodiment of the present invention.

Referring now to FIG. 3, a high level block diagram depicts a portable software architecture as described in detail in co-pending application titled, "Portable Software Architecture," assigned to the present assignee, and hereby incorporated by reference in its entirety. A computer 108 includes an operating system 300, stored in ROM 208 and main memory 206, having a networking component 302. The processor 204 executes operating system 300 instructions from memory 206 and/or ROM 208. Instructions for a web browser 304, as is known in the art, are executed by the processor 204 and access functionality provided by the operating system 300 including functionality of networking component 302. Although web browser 304 is shown and described as a native software application, it is to be understood that in alternate embodiments web browser 304 can be a virtual machine-based web browser, e.g., JAVA-based web browser, executing on a virtual machine (VM). JAVA is available from Sun Microsystems, Inc. Web browser 304 is a display and input interface for the user, i.e. the browser window is used to present information to the user and the same window is used to receive input from the user in the form of buttons, checkboxes, input fields, forms, etc.

Virtual machine 306 instructions are executed by processor 204 and cause the processor to access functionality provided by the operating system 300, e.g. function calls or method invocations. Virtual machine 306 executes a web application server 308 instructions to provide application serving functionality. In particular, web application server 308 executes an application 310 instructions in response to HTTP requests received by the web application server 308 from networking component 302. The application 310, interacting with the user provides the functionality requested by the user. For example, the application 310 may be a personal information management (PIM) software application managing contacts and related information for a user. The application 310 may be any software application desired by the user subject to memory and processing functionality.

The user interface displayed to the user for interacting with the application 310 is displayed by the web browser 304. The user interface, i.e. web browser 304, and the application 310 communicate using standard networking protocols, such as HTTP. HTTP requests and responses communicated between the web browser 304 and the application 310, are sent via the built-in networking component 302 of the operating system 300, using the same networking protocols that web browser 304 and application 310 would use if they were communicating over a network between different computing devices. Typically, the network protocol used is TCP/IP, but those skilled in the art will appreciate that other networking protocols could be substituted.

The application 310 does not send or receive networking messages directly, but rather the web application server 308 acts as a proxy and manages all network communication between the application 310 and the web browser 304. The web application server 310 and application 308 communicate via standard methods known to those skilled in the art.

When a user causes execution of the software application designed using the software architecture of the present invention, an HTTP request is transmitted to the web application server 308 via networking component 302 to begin execution of the application 310. In response to the HTTP request received from the web browser 304, the web application server 308 executes application 310 and transmits an HTTP response, containing the output of the application 310, via networking component 302 to the web browser 304. Typically, the output from application 310 will be in HTML, but any other web markup and/or layout language can be used.

All further interaction between the user and the application 310 is handled in the same manner, that is, the user interacts with the user interface as displayed by the web browser 304. Commands generated as a result of the user interacting with the display of the web browser 304 are translated into HTTP requests according to methods known to persons skilled in the art, and these requests are sent to the application 310 via networking component 302. The application 310 processes the received HTTP requests, and generates a response to send back to the web browser 304, thus continuing the user interface cycle. The application 310 response is sent back to the web browser 304, encapsulated within an HTTP response.

Alternatively, the web browser 304 and the application 310 could communicate using a standard networking protocol other than HTTP. Also alternatively, the application 310 could send its output to the web browser 304 using a display language other than HTML, e.g. user interface markup language (UIML), extensible markup language (XML), wireless markup language (WML), handheld device markup language (HDML), etc.

Figure 4:
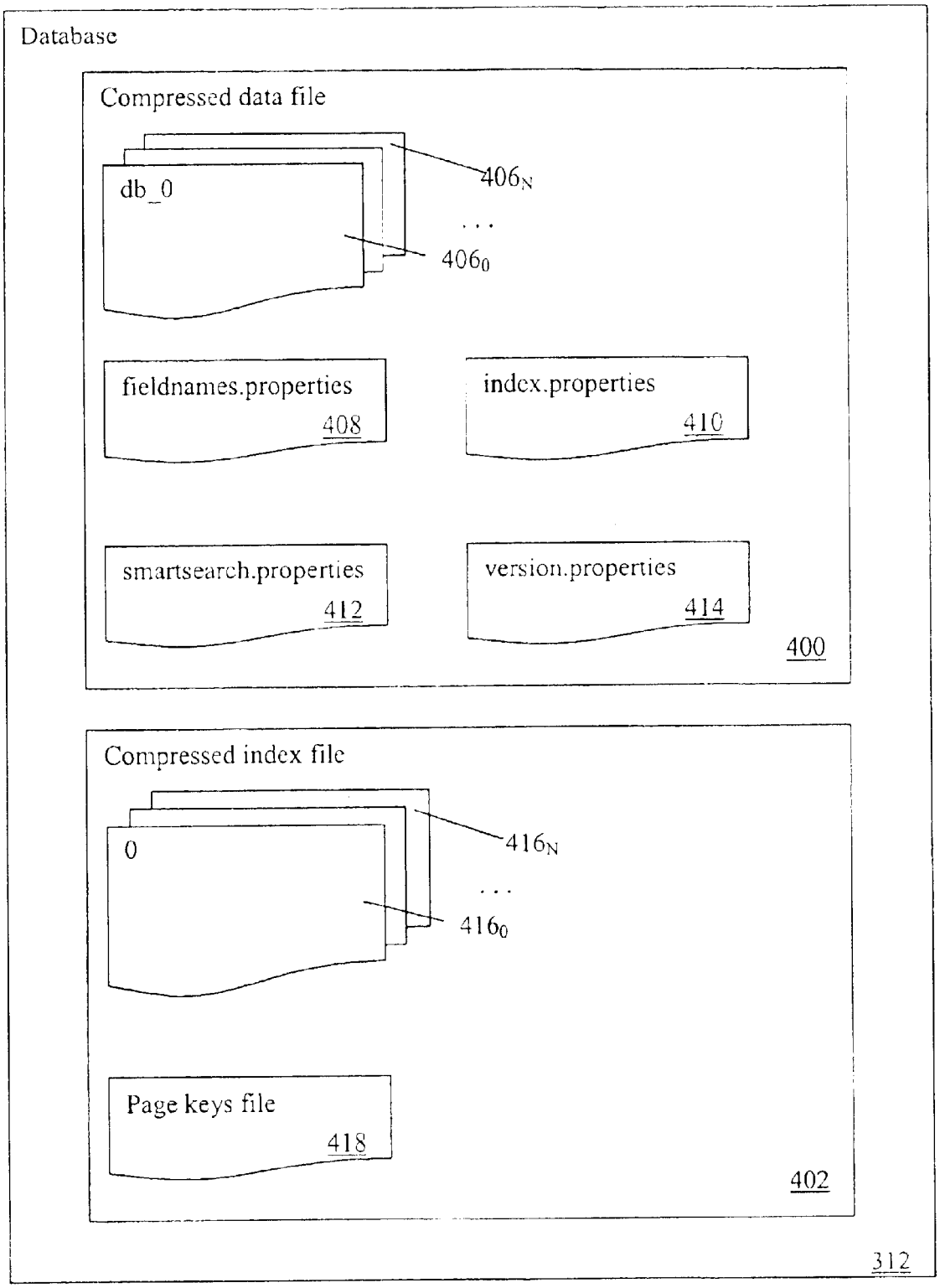
FIG. 4 is a high level block diagram of a compressed data structure for a database as used in an embodiment of the present invention.

Of note, FIG. 3 further includes a compressed database 312 according to an embodiment of the present invention for storing data accessed by the application 310. The compressed database 312 is utilized by the example software application of FIG. 3 and stored either in main memory 206 or storage device 210 of computer 108. As depicted in FIG. 4 and described in detail in co-pending application entitled, "Compressed Data Structure for a Database," database 312 includes a compressed group of files collectively forming the database. These files include a compressed data file 400 and a compressed index file 402.

A particular embodiment of the present invention employs the commonly used "zip"-type compression for compressing the files. The zip compression algorithms and file formats are known to persons of skill in the art. Zip compression software and libraries are available from multiple sources including PKWARE of Brown Deer, Wis. and Sun Microsystems, Inc. of Santa Clara, Calif. The type of compression used is not important as long as the needed functionality described below is supported, that is to say, it will be understood by persons of skill in the art that other compression formats are usable in conjunction with the present invention.

There may be more than one database 312 on each user device 108; however for clarity, only a single database will be described herein with reference to an embodiment of the present invention. Each database 312 includes the data file 400 and the index file 402 each in compressed form for a given database. Data file 400 is stored together with the corresponding index file 402 of the database 312 and in a particular embodiment data file 400 has a filename extension of ".ddb." Index file 402 is stored with data file 400 and includes the index name in the filename and in a particular embodiment index file 402 has a filename extension of ".idx."

The database data is in the compressed data file 400 and is a compressed file with the extension changed to .ddb, e.g. database.ddb. Compressed data file 400, in turn, is made up of a collection of files $406_0$-$406_N$, also referred to as pages, and a plurality of configuration files, specifically a fieldnames properties file 408, an index properties file 410, a smartsearch properties file 412, and a version properties file 414. In one particular embodiment, the pages $406_0$-$406_N$ are named db_[seq]0 where [seq] is a sequence number beginning with zero (0) and incrementing sequentially.

Pages $406_0$-$406_N$ are ordered by the sequence number. Each page $406_0$-$406_N$ stores a portion of the database data and in a particular embodiment carriage returns delimit individual records and tabs delimit individual fields. Using the key pages file 418 (described in detail below), a particular index page $416_0$-$416_N$ (also described in detail below) containing pointers to the compressed data pages $406_0$-$406_N$ is identified and decompressed. The decompressed index page $416_0$-$416_N$ is searched to identify the appropriate data page $406_0$-$406_N$ containing the searched for data. In this manner, only a portion of the entire database is decompressed for a given search.

The compressed database.ddb file includes both pages $406_0$-$406_N$ and a set of configuration files. The configuration files include:
fieldnames.properties;
index.properties;
smartsearch.properties; and
version.properties.

Fieldnames properties file 406 is a tab delimited file aligned with the pages $406_0$-$406_N$ such that each entry in fieldnames file 408 corresponds to a field in pages $406_0$-$406_N$. The number of entries in fieldnames properties file 408 equals the number of fields or entries for each record in pages $406_0$-$406_N$.

Index properties file 410 identifies the available indices for searching database 312. The entries in index properties file 410 is also used for building the indices with the update process described below. The index properties file 410 can list any of the fields named in fieldnames properties file 408.

Index properties file 410 is structured as a series of two field records and tabs delimit the fields and carriage returns delimit the records. The first field is the index name and the second is a filter applied to index values prior to indexing for creating a compressed index file 402. The filter changes the index value so that transformations on the data, i.e. the index value stored in memory prior to indexing, can be performed. In this manner, transformation of the index value is performed in memory prior to indexing and the transformed value is written to the index file 402. The original data page $406_0$-$406_N$ data is not modified in the data file 400 Examples of filters include soundex, or removing non-alphabetic characters.

Smart search is a method for searching database 312 based on a single string entry. Smart search analyzes the string and determines which set of indices and fields are appropriate for the search.

In one particular embodiment, smartsearch properties file 412 is formatted and read as a standard java language-based properties file. The smart searches displayed by the system for automatic index selection are based on the smartsearch properties file 412.

Each smartsearch properties file 412 entry includes the name of the search and the name of the property being searched, e.g. in one particular embodiment, the name of the search precedes the name of the property as in searchname-.property. Each of the properties are as follows:
match—a regular expression that is true if the string matches this search;
value—a regular expression that returns the search results as the parameters of the expression;
index—comma delimited index files that match the results returned by the value regular expression;
label—a label that can be used to identify the search on a graphical user interface (GUI);
filter—a class that can be used to filter the result value;
order—the evaluation order; and
listOrder—label order that can be used to display in a GUI.

Version properties file 414 is used by an updater or any other process to determine the version of the current database and in a particular embodiment, contains a single numeric entry in the format YYYYMMDD indicating the date of the database 312.

Index file 402 is stored with data file 400 and uses a filenaming convention such that the filename is of the format name-filter.idx, where name is the field name that is indexed and filter is the name of the filter that is applied.

In a manner similar to data file 400, the index file 402 is a compressed file including a set of index data files, referred to as index pages $416_0$-$416_N$, and a page keys file 418. In a particular embodiment, the index pages $416_0$-$416_N$ have a sequentially incrementing integer as a file name, starting with zero (0) and incrementing until all of the data is contained in the index pages $416_0$-$416_N$.

Within each index page $416_0$-$416_N$, the index data is stored as a repeating series of compressed pointer and index data and, in one embodiment, tabs are used to delimit each record. The index data of the index record is a copy of the indexed field in data file 400. Advantageously, because the index file 402 is compressed it is not necessary to attempt to minimize duplication as the compression of the index file handles the duplication elegantly. That is, processing time and capability and storage space need not be used to remove duplicate records from the compressed index file 402 because the compression of the index file 402 is used for this purpose without requiring additional functionality of the accessing or updating software application, e.g. application 310. For example, simply repeating the field value from the data page field in conjunction with a pointer is not an efficient storage structure; however, when used in conjunction with compression of the index file 402 much of the redundancy of the storage structure is removed.

Data within the index pages $416_0$-$416_N$ is ordered from first to last and each individual index page $416_0$-$416_N$ is identified by a zero based sequentially incrementing integer filename. Each record within an index page $416_0$-$416_N$ includes a pointer identifying the location of the corresponding record in the data file 400. In a particular embodiment, the pointer is an eight digit pointer value. The first three digits of the pointer value identify the data file page $406_0$-$406_N$ in which the corresponding record is located. The second five digits of the pointer value identify the offset from the start of the page $406_0$-$406_N$ in which the corresponding record is located.

In the embodiment described above, the eight digit pointer value is compressed into 4 bytes by taking the first 4 bits and last 4 bits of each byte to represent two digits in the pointer as shown in Table 1 below.

TABLE 1

| Data file page | | | Page offset | | | | |
|---|---|---|---|---|---|---|---|
| 0101 | 0111 | 0010 | 1000 | 0110 | 0100 | 0011 | 0001 |
| 5 | 7 | 2 | 8 | 6 | 4 | 3 | 1 |

Based on the example data of Table 1, the pointer value identifies a record in data file $406_0$-$406_N$ having a filename of "db_572" as corresponding to the indexed record. Further, the Table 1 pointer value identifies the record as being at an offset of "86431" in the identified data file $406_0$-$406_N$. Using this information, application 310 is able to quickly locate and extract data from compressed data file 400.

Page keys file 418 is included in the compressed index file 402 in order to increase the speed of locating and loading a particular index into memory 206. Page keys file 418 specifies the number of keys (index results), the key name, the number of pages in the index file 402, and a list of the index value of the last entry on each index page. A particular embodiment of page keys file 418 has the following tab-delimited format:

number of keys;
key name;
number of pages; and
the index value of the last entry on each index page with each value separated by a tab.

Processor 204 (FIG. 2) reads page keys file 418 prior to creating the index and storing the index in memory 206. Using the page keys file 418, the processor is able to allocate the required memory without having to determine the index size by traversing the index. The created index data structure is then read by the processor 204 executing instructions of an index search routine to establish in which index page the candidate key is stored.

The first three entries, i.e. number of keys, key name, and number of pages, are used by an index search algorithm to allocate memory for an index data structure. The repeating index value of the last entry are used by the index search algorithm to establish on which index page $416_0$-$416_N$ a particular key is stored. The index search algorithm scans down the array of last entry index values and compares each entry index value to the searched for key. If the search key is less than or equal to the last entry index value being inspected, then the key is stored in the index page $416_0$-$416_N$ associated with the last entry. If the search key is greater than the last entry index value being inspected, then the algorithm specifies a comparison be performed with the next index value entry.

Use of the page keys file 418, enables direct access to the required index page $416_0$-$416_N$ containing the searched for key value. Once the appropriate index page $416_0$-$416_N$ is identified, the identified index page is decompressed, loaded into memory 206, and is searchable using standard search algorithms. Only a single page of the index pages $416_0$-$416_N$ needs to be decompressed thereby saving time and storage space.

When user device 108 is connected via communication interface 218 and network link 220 to UDRS 104, information requests submitted by a user manipulating the device 108 may be transmitted directly to UDRS 104. In response, UDRS 104 provides the requested data from the UDRS database 102. However, if device 108 is not connected to UDRS 104 for a period of time, there is a possibility that the data in database 312 will not match the data in UDRS database 102.

Because database errors and un-updated entries in database 312 may result in missed or improperly directed telephone calls, email, postal mail, and other errors, it is necessary to periodically or on user request synchronize the data in database 312 with the data in UDRS database 102. A delta file, or change file, is created using the process described in detail in co-pending application entitled, "Compressed Data Structure for Extracted Changes to a Database," assigned to the present assignee and hereby incorporated in its entirety. Delta file 103 is generated based on changes to data in UDRS database 102.

After user device 108 connects to UDRS 104, a processor executing UDRS 104 instructions compares the version of database 312 on device 108 to the version of UDRS database 102. There are three possible comparison outcomes: (1) database 312 version is the same as UDRS database 102 version, (2) database 312 version is newer than the UDRS database 102 version, and (3) database 312 version is older than the UDRS database 102 version. If the database 312 does not exist on device 108, then the UDRS database 102 is transferred from UDRS 104 to device 108.

If the database 312 version is newer than the UDRS database 102, then there is data in database 312 which needs to be provided to UDRS 104 for updating UDRS database 102. Updated data from database 312 is transferred from device 108 to UDRS 104 for updating UDRS database 102. If the database 312 version is the same as the UDRS database 102, then there no update of database 312 is necessary and no data transfer occurs between device 108 and UDRS 104.

If the database 312 version is older than the UDRS database 102, then delta file 103 is downloaded to device 108 and database 312 is updated as described below.

After downloading delta file 103 to device 108, processor 204 generates a database 312 identical to the current UDRS database 102 using the contents of delta file 103. Delta file 103 specifies whether a line is to be added, updated, or deleted from database 312. In a particular embodiment, a new database 312a (not shown) is created as a result of comparison between delta file 103 and database 312 and new database 312a replaces the old database 312 on device 108 thereby minimizing data loss due to errors.

Figure 5:
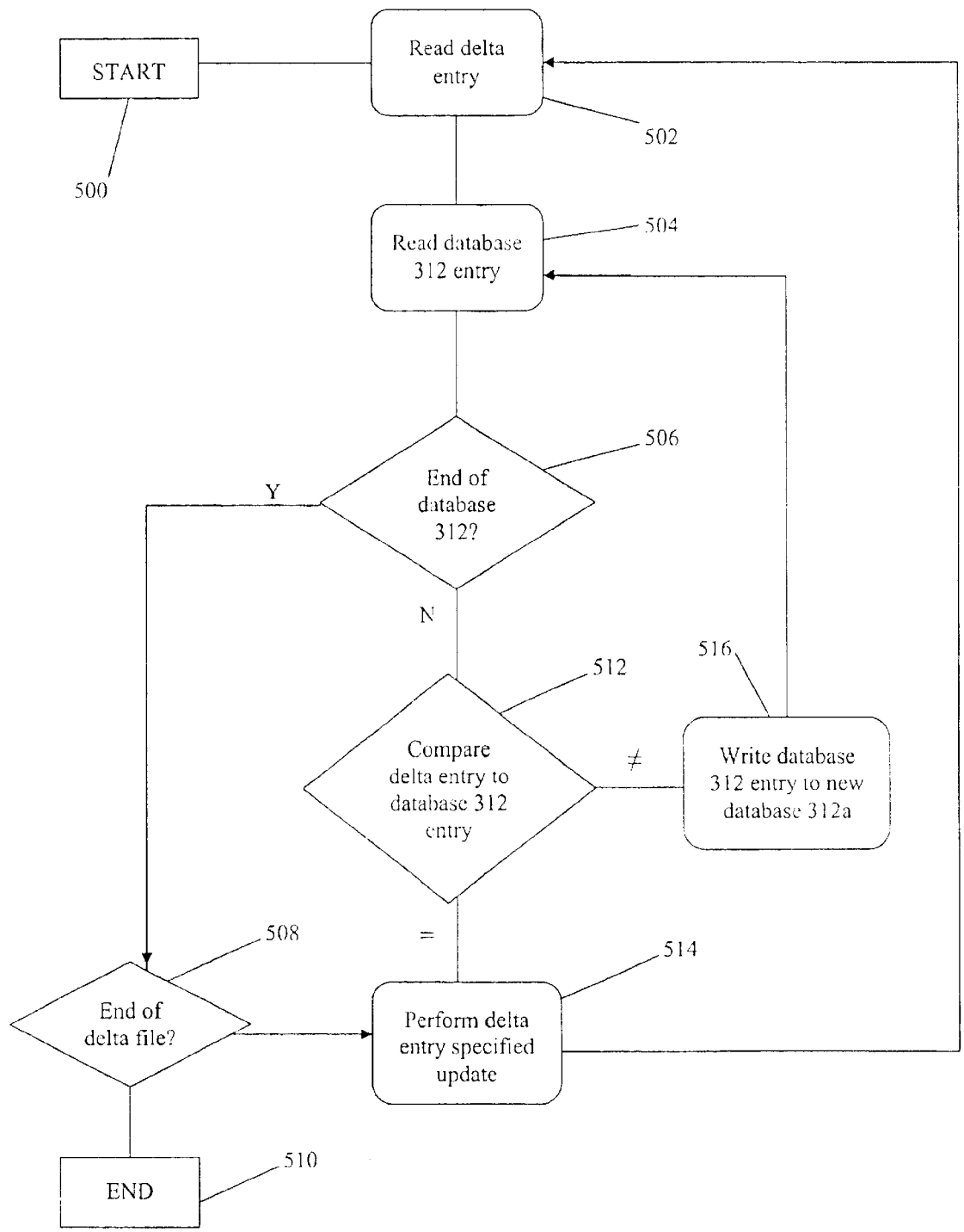
FIG. 5 is a high level diagram of a flow of control of a method in accordance with an embodiment of the present invention.

FIG. 5 depicts a process for updating data stored in a compressed data structure as executed by processor 204. At step 500, processor 204 begins execution of a sequence of instructions causing the processor to compare, and update as necessary, the data stored in database 312 with entries in the delta file 103 (after transfer from UDRS 104 to device 108). The flow of control proceeds to step 502 where processor 204 reads an entry, e.g. a line, from delta file 103. The flow of control proceeds to step 504 and processor 204 reads an entry from database 312.

In order to perform step 504, processor 204 decompresses a data page $406_0$-$406_N$ to memory 206 and increments sequentially through the decompressed data page $406_0$-$406_N$. Processor 204 proceeds to execute instructions causing the flow of control to proceed to step 506 wherein a determination is made whether the end of database 312 has been reached. That is, the process described and depicted in conjunction with FIG. 5 is executed for each of the data pages $406_0$-$406_N$. If the end of a particular data page $406_0$-$406_N$ is reached, the next sequential data page of data pages $406_0$-$406_N$ is decompressed and entries read in sequence from the data page.

If the outcome of the step 506 determination is that the end of database 312 has been reached, then the flow of control proceeds to step 508 wherein a determination is made whether the end of delta file 103 has been reached. If the outcome of the step 508 determination is that the end of delta file 103 has been reached, then the flow of control proceeds to step 510 and the update process is complete.

Returning to step 506, if the outcome of the step 506 determination is that the end of database 312 has not been reached, then the flow of control proceeds to step 512 wherein a comparison of the line number of the delta file entry read in step 502 is compared to the line number of the database 312 entry read in step 504. If the line numbers from the respective entries match, the flow of control proceeds to step 514 and the database 312 entry read is updated and written to a new database 312a. Processor 204 executing the sequence of instructions for step 514 reads the delta file entry instructions and either (1) modifies the database 312 entry accordingly or (2) does not write an entry to new database 312a, i.e. the entry is deleted from the new database 312a by not being written. The flow of control of processor 204 execution proceeds to step 502 to continue the process with the next delta file 103 entry.

Returning to step 512, if the outcome of the step 512 determination is that the line numbers from the respective entries do no match, the flow of control proceeds to step 516 and the database 312 entry read is written to new database 312a. The flow of control of processor 204 execution proceeds to step 504 to continue the process with the next database 312 entry.

Returning to step 508, if the outcome of the step 508 determination is that the end of delta file 103 has not been reached, the flow of control proceeds to step 514. If step 514 has been reached from step 508, then there is an additional entry to be added to database 312 beyond the existing entries. Processor 204 execution of step 514 causes a new entry specified by delta file 103 entry to be written to new database 312a and the flow of control proceeds to step 502.

After completing the update process described above, new database 312a is used in place of old database 312 and indices $416_0$-$416_N$ for the new database 312a are generated using the process described in detail in co-pending application entitled, "Compressed Data Structure for a Database."

It will be readily seen by one of ordinary skill in the art that the present invention fulfills all of the objects set forth above. After reading the foregoing specification, one of ordinary skill will be able to affect various changes, substitutions of equivalents and various other aspects of the invention as broadly disclosed herein. It is therefore intended that the protection granted hereon be limited only by the definition contained in the appended claims and equivalents thereof.

What is claimed is:

1. A method of updating data stored in a compressed data structure, wherein the data is stored in entries in one or more uniquely identified data pages, based on a change entry in a delta file, the method comprising:

decompressing an existing data page;

comparing an entry from the existing data page with a change entry in the delta file; if the change entry identifies the existing data page entry, updating the existing data page entry and writing the updated data page entry to a new data page; if the change entry does not identify an existing data page entry, writing a new data page entry to the new data page;

after comparing existing data page entries with change entries, compressing the new data page.

2. A method of updating data stored in a compressed data structure, wherein the data is stored in compressed form in one or more uniquely identified data pages, the method comprising:

decompressing a data page;

reading an entry from a delta file, wherein the delta file entry has an identifier;

reading an entry from the decompressed data page;

determining if the delta file entry identifier identifies the data page entry;

if the identifier identifies the data page entry, updating the data page entry based on the delta file entry;

if the identifier does not identify a data page entry, creating a data page entry based on the delta file entry;

if all delta file entries and data page entries have been read, compressing the data page entries.

3. The method of claim 2, further comprising the step of:
   writing the updated or created data page entry to a second data page, and wherein the compressed data page entries are in the second data page.

4. The method of claim 2, further comprising the step of:
   after the second data page is compressed, deleting the data page.

5. The method of claim 2, wherein the identifier is a line number.

6. The method of claim 2, wherein the delta file includes version information and the compressed data structure includes version information.

7. The method of claim 6, further comprising the steps of:
   comparing the delta file version information with the data structure version information; and
   if the delta file version information is more recent than the data structure version information updating the data structure based on the delta file.

8. The method of claim 2, further comprising the step of:
   generating an index of the compressed data page entries.

9. The method of claim 2, wherein the updating the data page entry step includes at least one of modifying the data page entry and deleting the data page entry.

10. A computer-readable medium comprising:

a data structure for a compressed database comprising:

one or more uniquely identified, compressed data pages structured for storing one or more uniquely identified data page entries; and a delta file structured for storing a change entry having a unique identifier;

at least one sequence of machine executable instructions in machine form, wherein execution of the instructions by a processor cause the processor to:

(A) read a change entry from the delta file;

(B) decompress a data page from the compressed database;

(C) search for a data page entry in the decompressed data page matching the change entry identifier;

(D) if a match is found, update the matching data page entry based on the delta file entry;

(E) if a match is not found, create a data page entry based on the delta file entry; and (F) compress the data page entries.

11. The computer-readable medium of claim 10, wherein the instructions to compress the data page entries further comprise instructions which, when executed by the processor, cause the processor to:

compress the updated, created, and unmatched data page entries in a second data page.

12. The computer-readable medium of claim 11, further comprising instructions which, when executed by the processor, cause the processor to:

replace the decompressed data page with the second data page; and compress the second data page with the compressed database.

13. The computer-readable medium of claim 10, further comprising instructions which, when executed by the processor, cause the processor to:

after decompressing the data page, copy the decompressed data page to a second data page and perform steps A, C, D, and E for each change entry in the delta file.

14. The computer-readable medium of claim 13, further comprising instructions which, when executed by the processor, cause the processor to:

replace the decompressed data page with the second data page; and compress the second data page with the compressed database.

15. The computer-readable medium of claim 10, wherein the change entry identifier is a line number.

16. The computer-readable medium of claim 10, wherein the delta file includes version information and the compressed database includes version information.

17. The computer-readable medium of claim 16, further comprising instructions which, when executed by the processor, cause the processor to:

compare the delta file version information with the data structure version information; and if the delta file version information is more recent than the data structure version information, update the data structure based on the delta file.

18. The computer-readable medium of claim 10, further comprising instructions which, when executed by the processor, cause the processor to:

generate an index of the compressed data page entries.

19. The computer-readable medium of claim 10, further comprising instructions which, when executed by the processor, cause the processor to:

generate an index of the compressed database.

20. The computer-readable medium of claim 10, wherein the update the data page entry step includes at least one of modify the data page entry and delete the data page entry.

* * * * *